(12) United States Patent
Nomura

(10) Patent No.: US 7,014,350 B2
(45) Date of Patent: Mar. 21, 2006

(54) ILLUMINATION UNIT AND LIQUID CRYSTAL DISPLAY COMPRISING IT

(75) Inventor: Mitsuo Nomura, Kanazawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/510,849

(22) PCT Filed: Sep. 18, 2002

(86) PCT No.: PCT/JP02/09568

§ 371 (c)(1),
(2), (4) Date: Oct. 13, 2004

(87) PCT Pub. No.: WO2004/027312

PCT Pub. Date: Apr. 1, 2004

(65) Prior Publication Data

US 2005/0157517 A1    Jul. 21, 2005

(51) Int. Cl.
*F21V 7/04* (2006.01)

(52) U.S. Cl. .................. 362/623; 362/609; 362/634

(58) Field of Classification Search .......... 362/26, 362/31, 561, 609, 630, 632, 633, 634, 623; 349/58, 63, 65, 67

See application file for complete search history.

(56) References Cited

U.S. PATENT DOCUMENTS

| 5,280,372 A | * | 1/1994 | Horiuchi ...................... 349/65 |
| 5,815,227 A | * | 9/1998 | Lee .............................. 349/67 |
| 6,445,430 B1 | * | 9/2002 | Sakamoto et al. ............ 349/62 |

FOREIGN PATENT DOCUMENTS

| JP | 4-111117 | 9/1992 |
| JP | 2001-216827 A | 8/2001 |
| JP | 2001-250416 A | 9/2001 |

* cited by examiner

*Primary Examiner*—Y. My Quach-Lee
(74) *Attorney, Agent, or Firm*—McDermott Will & Emery LLP

(57) ABSTRACT

A lighting unit comprises a light source, a light guiding plate for guiding light emitted from the light source, a reflecting sheet disposed at least a portion of a surface of the light guiding plate, and a casing configured to store the light guiding plate provided with the reflecting sheet, wherein a space between the casing and the light guiding plate is separated from a space above the light guiding plate by an extended portion formed by extending the reflecting sheet disposed on the surface of the light guiding plate.

6 Claims, 8 Drawing Sheets

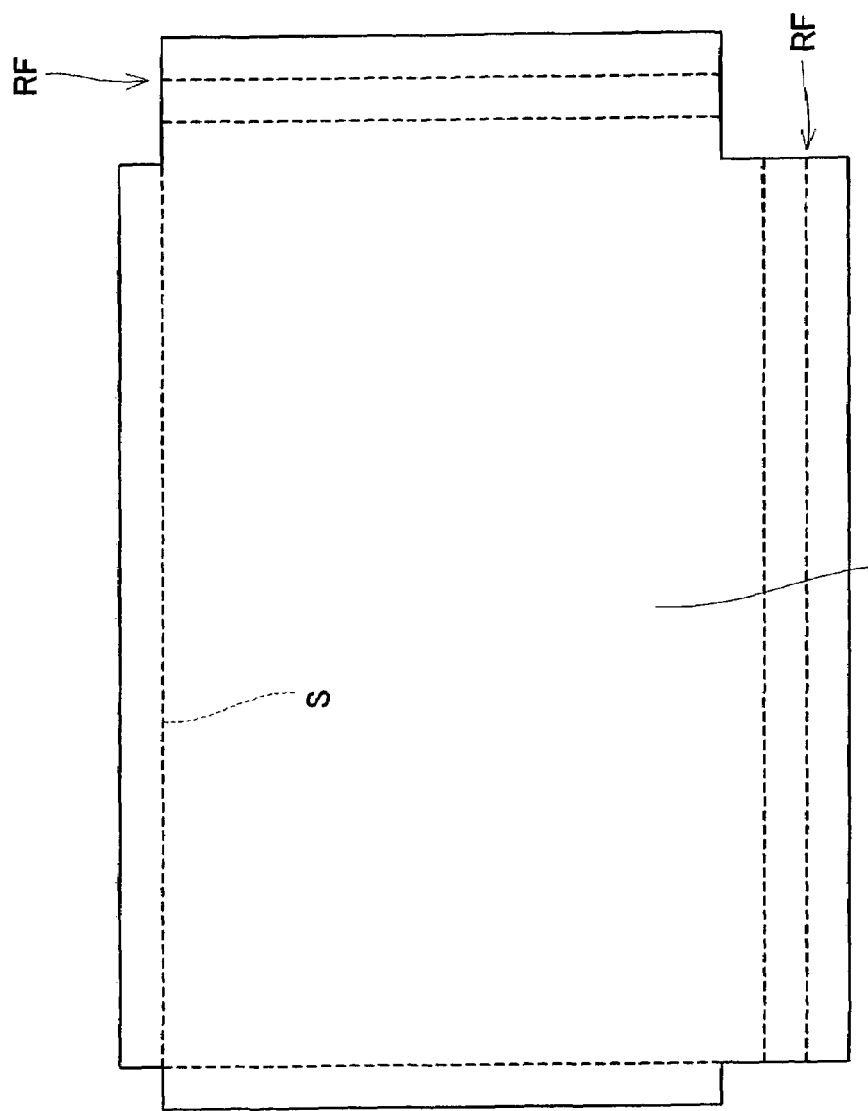

ILLUMINATION UNIT AND LIQUID CRYSTAL DISPLAY COMPRISING IT

TECHNICAL FIELD

The present invention relates to a lighting unit provided with a light source on a side surface of a light guiding plate and to a liquid crystal display device using the same.

BACKGROUND ART

Recently, a liquid crystal display device has been widely used as a display device of an information device such as a notebook-type personal computer, a word processor and the like, or as a display device of a video device such as a portable television, a video movie, a car navigation system and the like, by taking advantage of a characteristic in which the liquid crystal display device is light and thin, and consumes small electricity. Such liquid crystal display device typically has a structure in which a display element is illuminated from behind by a built-in lighting unit for obtaining a bright display screen.

As a lighting unit, there is an edge light type lighting unit in which a linear light source such as a fluorescent discharge tube is disposed on an end face of a light guiding plate disposed on a rear surface of the display element (an opposite surface of a display surface of the element). The edge light type is characterized in that a thin lighting unit and a highly uniform luminance of a light emitting surface thereof can be obtained. Therefore, in order to give priority to thinness of the lighting unit, the edge light type is commonly adopted in the lighting unit used as a back light of the liquid crystal display device composing the notebook-type personal computer and the like. And, in the liquid crystal display device composing the portable television, the car navigation system and the like, the edge light type comprising two or more linear fluorescent discharge tubes, or the edge light type using a fluorescent discharge tube disposed extensively continuously along an outer periphery of side portions of the light guiding plate, for example, an L-shaped or a U-shaped fluorescent discharge tube, are commonly adopted for the thinness and the luminance to be compatible with each other.

The fluorescent discharge tube used as the light source is driven by a high frequency alternating current to emit light. So, lead wires are respectively connected to both end portions of the fluorescent discharge tube disposed on the side portions of the light guiding plate, for externally supplying a predetermined drive voltage. And, the two lead wires connected to the end portions are provided with connectors at tip end portions thereof and are connected to an inverter externally provided. Since the liquid crystal display device is required to provide improved portability and to save a space, it is important to compactly dispose the light guiding plate, the fluorescent discharge tube, the lead wires, each of which composes the lighting unit, within the lighting unit and liquid crystal display device to allow the device to be light and thin.

FIG. 6 is a plan view schematically showing the conventional edge light type lighting unit, seen from a light emanating side. FIG. 7 is a cross-sectional view schematically showing a structure of the liquid crystal display device comprising the lighting unit shown in FIG. 6. The lighting unit part thereof corresponds to a cross-sectional view taken along line VII–VII' in FIG. 6. In FIG. 6, to describe the structure, only a part of components of the lighting unit shown in FIG. 7 are shown.

As shown in FIGS. 6 and 7, a lighting unit UT comprises as main components, a light guiding plate 1, a fluorescent discharge tube 2, a reflecting sheet 3, a lower casing 9, and an upper casing 10. A liquid crystal panel 11 and a front cover 12 are disposed on the lighting unit UT to compose a liquid crystal display device LD.

In the lighting unit UT, the L-shaped fluorescent discharge tube 2 is disposed along two adjacent end faces D1 of a flat transparent light guiding plate 1, as the light source. Lead wires 7 are respectively attached to end portions of the fluorescent discharge tube 2 by soldering or the like. Each of the lead wires 7 is disposed along each of two end faces D2 of the light guiding plate 1, on which the fluorescent discharge tube 2 is not disposed, and is connected to a power supply unit 20 such as an inverter disposed outside of the lighting unit UT, through a through-hole H provided on a side surface of the lower casing 9, as described below. When the lighting unit UT emits light, a high voltage is applied through the lead wires 7 for lighting the fluorescent discharge tube 2. For this reason, cylindrical holders 8 made of an insulating material such as rubber are attached to connecting portions between the lead wires 7 and the fluorescent discharge tube 2, for safely applying the high voltage and for protecting electrodes of the fluorescent discharge tube 2.

The two end faces D2 of the light guiding plate 1, on which the fluorescent discharge tube 2 is not disposed, a rear surface (an opposite surface of the light emanating surface) of the light guiding plate 1, and a vicinity of the two end faces D1 of the light guiding plate 1, on which the fluorescent discharge tube 2 is disposed and the fluorescent discharge tube 2 are continuously covered with the reflecting sheet 3. As used herein, reflector portions RF refer to portions including the vicinity of the two end faces D1 of the light guiding plate 1, on which the fluorescent discharge tubes 2 are disposed, and the fluorescent discharge tubes 2. As the reflecting sheet 3, for example, a white resinous film having a high reflectivity is used. The reflecting sheet 3 may be provided with a printed pattern for promoting diffusion of light as it is distant from the fluorescent discharge tube 2. FIG. 8 is an expansion plan of the reflecting sheet 3. As shown in FIG. 8, the reflecting sheet 3 is obtained by cutting in a predetermined shape configured to cover the above-described regions of the light guiding plate 1 and the reflector portion RF, and is provided with fold lines S in predetermined portions so that the sheet 3 is folded so as to correspond to the regions to be covered. Although herein, one reflecting sheet 3 configured to continuously cover the above-described regions is used, the reflecting sheet 3 may be separated into a reflecting sheet 3 covering the reflector portion RF and a reflecting sheet 3 covering the light guiding plate 1, which may be bonded to each other by a double face adhesive tape or the like. However, when the integral-type reflecting sheet 3 is used as shown in FIG. 8, a thin lighting unit, cost reduction thereof, and reduction of the number of assembling processes are effectively achieved.

As shown in FIG. 7, the light guiding plate 1 and the fluorescent discharge tube 2 covered with the reflecting sheet 3, and the lead wires 7 disposed along the end faces D2 of the light guiding plate 1 with the reflecting sheet 3 interposed between the lead wires 7 and the end faces D2 are stored within the lower casing 9 of a rectangular parallelepiped shape. Within the lower casing 9, the lead wires 7 are stored within a space E2 formed by an inner wall of the casing and the end faces D2 of the light guiding plate 1 covered with the reflecting sheet 3. The through-hole H is provided on a predetermined portion of the lower casing 9 to allow the space E2 and outside of the unit to communicate with each other, and the lead wires 7 are pulled out of the lower casing 9 through the through-hole H. The fluorescent discharge tube 2 is stored within a space E1 formed by the inner wall of the casing which substantially contacts the reflecting sheet 3, and the end faces D1 of the light guiding plate 1.

In order to make the lighting unit UT smaller, width M1 of the space E1 in which the fluorescent discharge tube 2 is stored and width M2 of the space E2 in which the lead wires 7 are held, are set to be as small as possible, i. e., a minimum width necessary for the fluorescent discharge tube 2 and the lead wires 7 to be disposed. Herein since a diameter of the lead wire 7 is smaller than that of the fluorescent discharge tube 2, the width 2 of the space E2 is smaller than the width 1 of the space E1. The width M1 of the space E1 corresponds to a distance between the inner wall of the casing 9 and the end face D1 of the light guiding plate 1, and the width M2 of the space E2 corresponds to a distance between the inner wall of the casing 9 and the end face D2 of the light guiding plate 1.

Light correction sheets 4 and 5 are further disposed on the light emanating surface side of the light guiding plate 1 stored within the lower casing 9. The light correction sheets 4 and 5 are not bonded to the light guiding plate 1, and there is a gap between them. As the light correction sheet, a plurality of light diffusion sheets for diffusing light, prism sheets for collecting light or the like are disposed as necessary. Thereby, it becomes possible to obtain a uniform and highly luminous light by diffusing and collecting the light emitted from the light guiding plate 1.

The upper casing 10 as a lid member of the lower casing 9 is fitted to the lower casing 9 so as to store the light guiding plate 1 stored within the lower casing 9 and the light correction sheets 4 and 5 disposed on the light guiding plate 1. In this way, the lighting unit UT is structured. A liquid crystal panel 11 is disposed on the light emanating surface side of the light guiding plate 1 of the lighting unit UT, and the front cover 12 is further attached to compose a liquid crystal display device LD. The liquid crystal panel 11 and the light correction sheets 4 and 5 are not bonded to each other, and there is a gap between them.

When the lighting unit UT and the liquid crystal display device LD structured as described above are operating, the high frequency alternating current generated in the power supply unit (not shown) such as the inverter is given to the fluorescent discharge tube 2 through the lead wires 7. Thereby, the high voltage is applied to the fluorescent discharge tube 2, which is thereby lighted. Light emitted from the fluorescent discharge tube 2 is introduced from the end faces D1 of the light guiding plate 1 into an inside thereof, passes through the inside thereof, and emanates from the emanating surface thereof. Since the light leaking out of the light guiding plate 1 and the fluorescent discharge tube 2 is reflected by the reflecting sheet 3 and is guided into the light guiding plate 1 again, it becomes possible to increase an amount of light emanating from the light emanating surface of the light guiding plate 1. The light emanating from the light guiding plate 1 is diffused and collected by the light correction sheets 4 and 5 and then enters the liquid crystal panel 11 disposed above. In the liquid crystal panel 11, display is performed by using this light. Hereinafter, a region of the liquid crystal panel 11 on which the display is performed and a region located below the above-described region and concerning the display by supplying the above-described region with light are referred to as a display region of the liquid crystal display device LD.

In the conventional lighting unit UT and the liquid crystal display device LD as described above, the light guiding plate 1 and the light correction sheets 4 and 5 are not bonded to each other, and the light correction sheets 4 and 5 and the liquid crystal panel 11 are not bonded to each other, as described above. Therefore, there are gaps between the light guiding plate 1 and the light correction sheets 4 and 5, and between the light correction sheets 4 and 5 and the liquid crystal panel 11. For this reason, dust might enter the gaps. When the dust enters the display region of the liquid crystal display device LD, the emitted light is blocked by the dust, which causes non-uniform luminance to occur. And, since components in the display region such as the light correction sheets 4 and 5 are damaged by a friction between the components and the dust, light emission capability is deteriorated. Once the dust enters a gap between the liquid crystal panel 11 and the lighting unit UT, it is very difficult to clear the dust away without disassembling the panel 11 and the unit UT.

For example, in the above-described lighting unit UT, the through-hole H for pulling out the lead wires 7 is provided on the lower casing 9 to allow an outside of the lighting unit UT and an inside thereof to communicate with each other. Therefore, the dust generated outside of the liquid crystal display device when assembling the same enters the lower casing 9 through the through-hole H provided on the lower casing 9, as indicated by arrow G in FIG. 7, and further enters the display region. Although not shown in FIG. 7, a plurality of through-holes are formed on the lower casing 9 for assembling the same and the upper casing 10, and the dust also enters the inside through these through-holes. Furthermore, the dust existing within the unit also enters the display region in addition to the dust entering from outside of the unit.

Herein, as described above, since the width M2 of the space E2 in which the lead wires 7 are disposed is smaller than the width M1 of the space E1 in which the fluorescent discharge tube 2 is disposed, distance between the entered dust and the display region is shorter in the space E2 than in the space E1. Therefore in the space E2, it is highly possible that the dust enters an effective display region.

One method for solving the above-described problem, another component for blocking entry of the dust may be disposed on a path through which the dust enters (for example, arrow G in FIG. 7). However, the lighting unit UT and the liquid crystal display device LD are required to be light and small as described above, dimension between the light guiding plate 1 and an outer shape of the liquid crystal display device LD and weight of the device are restricted. Consequently, it is difficult to dispose such a component in the vicinity of the light guiding plate 1.

DISCLOSURE OF THE INVENTION

An object of the present invention is to provide a lighting unit capable of inhibiting dust from entering a display region, and a liquid crystal display device using the same, with a simple structure using existing components.

In order to achieve the above object, according to the present invention, there is provided a lighting unit comprising a light source, a light guiding component for guiding light emitted from the light source to an object to be illuminated, a reflecting component configured to cover at least a part of a surface of the light guiding component, and a casing configured to store the light source and the light guiding component covered with the reflecting component, wherein a separating portion which is a part of the reflecting component is disposed in at least a part of a space formed between the light guiding component and an inner wall of the casing and communicating with the object to be illuminated.

In such a configuration, since the separating portion is disposed in the space which communicates with the object to be illuminated, it becomes possible for the separating portion to inhibit the dust entering from outside of the lighting unit or the dust existing within the unit from further entering the object to be illuminated. Thereby, it becomes possible to inhibit the light emitted from the light guiding component to the object to be illuminated from being blocked by the dust, and to inhibit occurrence of damage to the components such as the object to be illuminated due to the dust.

Since the separating portion is disposed by using a part of the reflecting component, it is not necessary to provide another component. So, entry of the dust can be inhibited with a simple structure without affecting lightness and small size of the lighting unit.

It is preferred that the casing has a through-hole to allow the space to communicate with outside of the unit, and that the separating portion is disposed at least in the vicinity of the through-hole of the space.

In the lighting unit, the through-hole, for example, for electrical wiring, is provided on the casing, and the space communicates with outside of the unit through the through-hole. So, it is highly possible that the dust enters the unit from outside through the through-hole. However, in such a configuration, since the separating portion is disposed in the vicinity of the through-hole, the dust entering from outside can be effectively inhibited from further entering the object to be illuminated, by the separating portion.

It is preferred that the separating portion is extended from a surface of the light guiding component to an inner wall of the casing.

In such a configuration, a path from the space to the object to be illuminated is completely cut off by the separating portion. Therefore, it becomes possible to reliably inhibit the dust from entering the object to be illuminated.

The light guiding component may be a light guiding plate, the light source may be disposed along a first end face of the light guiding plate, a lead wire may be disposed along a second end face of the light guiding plate, for supplying the light source with a voltage, a bottom surface of the light guiding plate, the first end face of the light guiding plate and the light source, and the second end face of the light guiding plate may be covered with the reflecting component, and the separating portion may be disposed at least in the space between the second end face of the light guiding plate and the inner wall of the casing.

In such a configuration, the lighting unit of an edge light type, in which the light source is disposed along the first end face of the light guiding plate is obtained. In the lighting unit, since light leaking out of the light source and the light guiding plate is reflected by the reflecting component and is guided to the light guiding plate, it becomes possible to increase an amount of light emanating from the light emanating surface of the light guiding plate to the object to be illuminated. In such a configuration, typically, width of a space between the first end face of the light guiding plate and the inner wall of the casing (hereinafter, referred to as a first space) is set according to a diameter of the light source disposed within the first space, in order to make the unit smaller. Likewise, width of a space between the second end face of the light guiding plate and the inner wall of the casing (hereinafter, referred to as a second space) is set according to a diameter of the lead wire disposed within the second space. In general, since the diameter of the lead wire is larger than that of the light source, the width of the second space is smaller than that of the first space. Therefore, a distance to the object to be illuminated is smaller in the second space than in the first space, so that the dust tends to enter the object to be illuminated especially through the second space. In such a configuration, since the separating portion is disposed in the second space where the dust might easily enter, the entry of the dust can be effectively inhibited.

The reflecting component may be a reflecting sheet. In such a configuration, since the separating portion is provided by using the reflecting sheet which is easy to fold and cut, it becomes possible to dispose the separating portion in a predetermined position and in a predetermined shape. And, since the reflecting sheet is thin and light, this does not affect the lightness and small size of the unit, even when the separating portion formed by the reflecting sheet is disposed.

The liquid crystal display device according to the present invention comprises the above-described lighting unit according to the present invention and the liquid crystal panel disposed on the light emanating surface side of the lighting unit.

In such a configuration, since the lighting unit according to the present invention is used, it becomes possible to inhibit the dust from entering the liquid crystal panel as the object to be illuminated from the lighting unit, while achieving a light and small device. Therefore, it becomes possible to inhibit occurrence of non-uniform luminance due to the dust entry to the display region of the liquid crystal display device, and to inhibit damage to the components of the display region by the dust. Furthermore, it is not required to disassemble the device to clear the entered dust away, or a frequency of disassembling the same is reduced. Thus, maintenance becomes easier.

The object, as well as other objects, features and advantages of the present invention will become more apparent from the following detailed description of the preferred embodiments taken with reference to the accompanying drawings.

BRIEF DESCRIPTION OF THE DRAWINGS

FIG. 8 is an expansion plan of a reflecting sheet shown in FIG. 6.

BEST MODE FOR CARRYING OUT THE INVENTION

Hereinafter, embodiments of the present invention will be described with reference to the drawings.

FIRST EMBODIMENT

Figure 1:
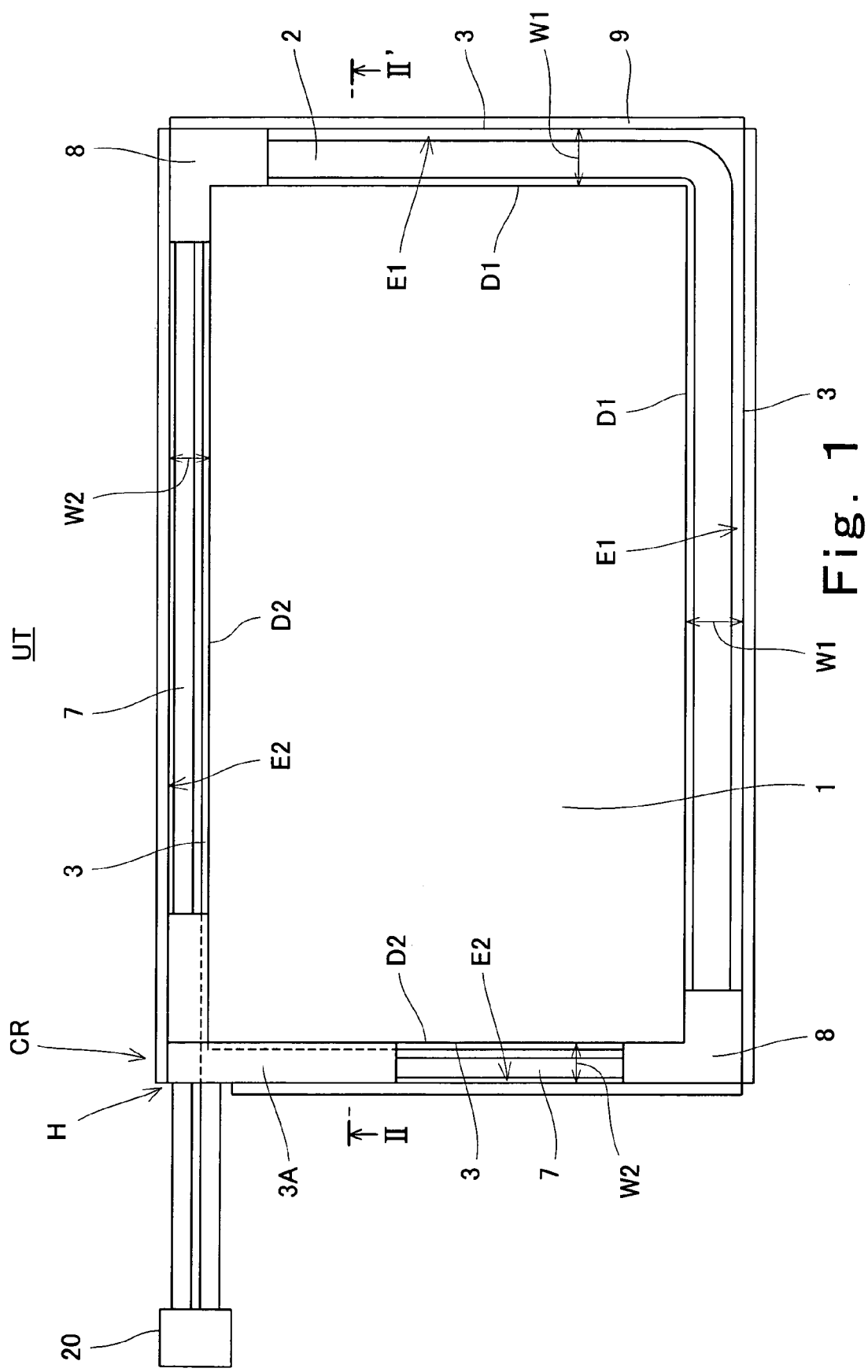
FIG. 1 is a plan view schematically showing a structure of a lighting unit according to a first embodiment of the present invention.
Figure 2:
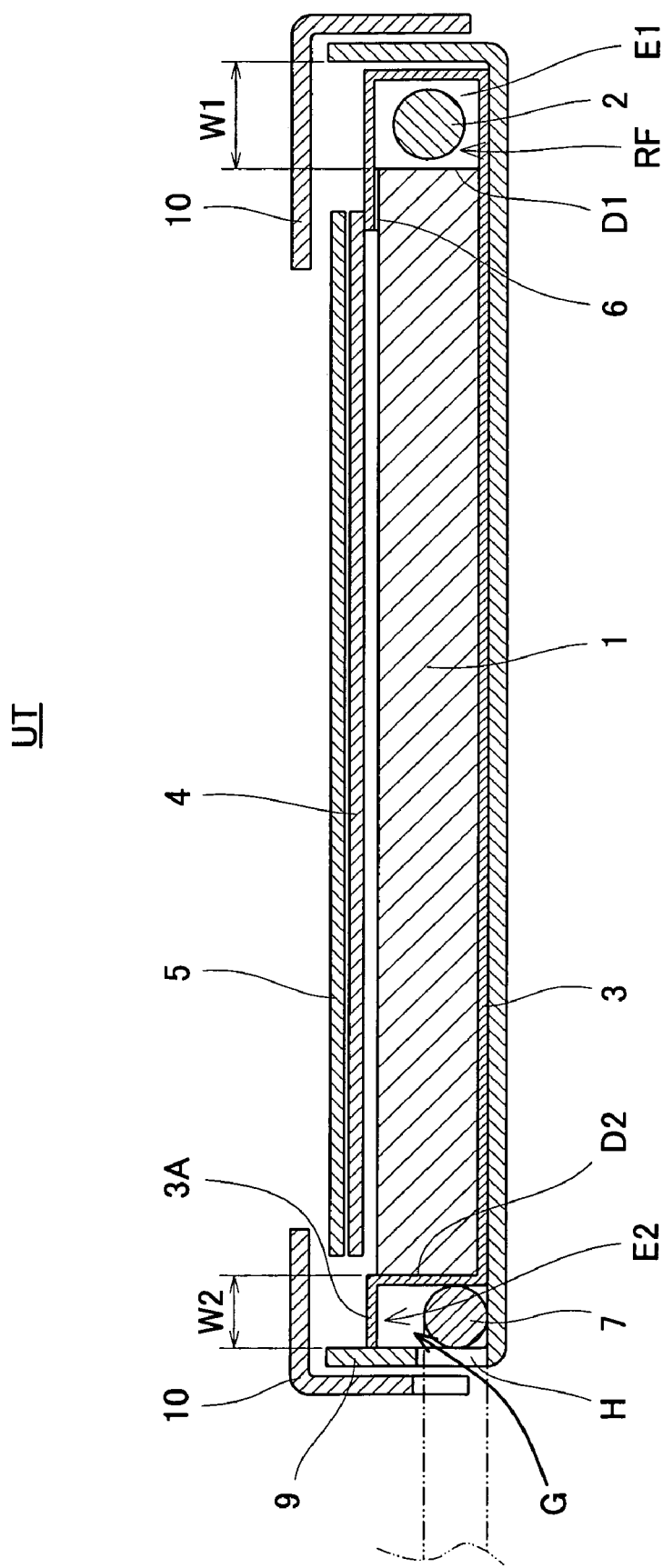
FIG. 2 is a schematic cross-sectional view taken along line II–II' in FIG. 1.

FIG. 1 is a plan view of a lighting unit according to a first embodiment of the present invention, seen from a light emanating surface side. And, FIG. 2 is a cross-sectional view taken along line II–II' in FIG. 1. In FIG. 1, to describe a structure of the lighting unit, some of components shown in FIG. 2 are omitted. As shown in FIGS. 1 and 2, a lighting unit UT comprises as main components, a light guiding plate 1, a fluorescent discharge tube 2 as a light source, a reflecting sheet 3, a lower casing 9, and an upper casing 10.

The light guiding plate 1 is a flat transparent plate, and is made of a material having necessary or optimal optical characteristics, such as transmissivity and a refractive index or the like required for transmitting light, for example, acrylic. The light guiding plate 1 is provided with, for example, a dot pattern or a groove pattern (not shown) on a rear surface thereof, which varies a shape thereof according to a distance from the fluorescent discharge tube 2, for diffusing light entering the light guiding plate 1 from the fluorescent discharge tube 2. The L-shaped fluorescent discharge tube 2 is disposed along continuous end faces D1 corresponding to a long side and a short side of the light guiding plate 1. Herein, the end faces D1 of the light guiding plate 1 are incident end faces of the light. Lead wires 7 are respectively attached to both end portions of the fluorescent discharge tube 2 by soldering or the like, for externally supplying the fluorescent discharge tube 2 with a drive voltage. Cylindrical holders 8 made of an insulating material such as rubber are attached to connecting portions between the lead wires 7 and the fluorescent discharge tube 2. Each of the lead wires 7 is disposed along each of continuous end faces D2 corresponding to a long side and a short side of the light guiding plate 1, along which the fluorescent discharge tube 2 is not disposed, and is connected to a power supply unit 20 such as an inverter provided outside of the lighting unit UT.

The end faces D2 of the light guiding plate 1, along which the fluorescent discharge tube 2 is not disposed, a rear surface (an opposite surface of the light emanating surface) of the light guiding plate 1, and a vicinity of the end faces D1 of the light guiding plate 1, along which the fluorescent discharge tube 2 is disposed, and the fluorescent discharge tube 2 (hereinafter, referred to as a reflector portion RF) are continuously covered with the reflecting sheet 3. In the reflector portion RF where the reflecting sheet 3 covers the end faces D1 of the light guiding plate 1 and the fluorescent discharge tube 2, an end portion of the reflecting sheet 3 folded so as to enclose the fluorescent discharge tube 2 is fixed to a surface (the light emanating surface) of the light guiding plate 1 by an adhesive 6 such as a double face adhesive tape. Furthermore, in a predetermined portion of a space E2 to be described later, formed along the end faces D2 of the light guiding plate 1, in which the lead wires 7 are disposed, specifically, in a space E2 in a corner portion CR including a through-hole H to be described later, provided on the lower casing 9, the reflecting sheet 3 covering the end faces D2 of the light guiding plate 1 is extended to an inner surface of a side wall of the lower casing 9. Hereinafter, a region of the reflecting sheet 3 thus extended is referred to as an extended separating portion 3A. The above-described portion of the space E2 is covered with such extended separating portion 3A. Thereby, a region above the light guiding plate 1 is separated from the space E2 in normal direction of a principal surface of the light guiding plate 1.

Figure 3:
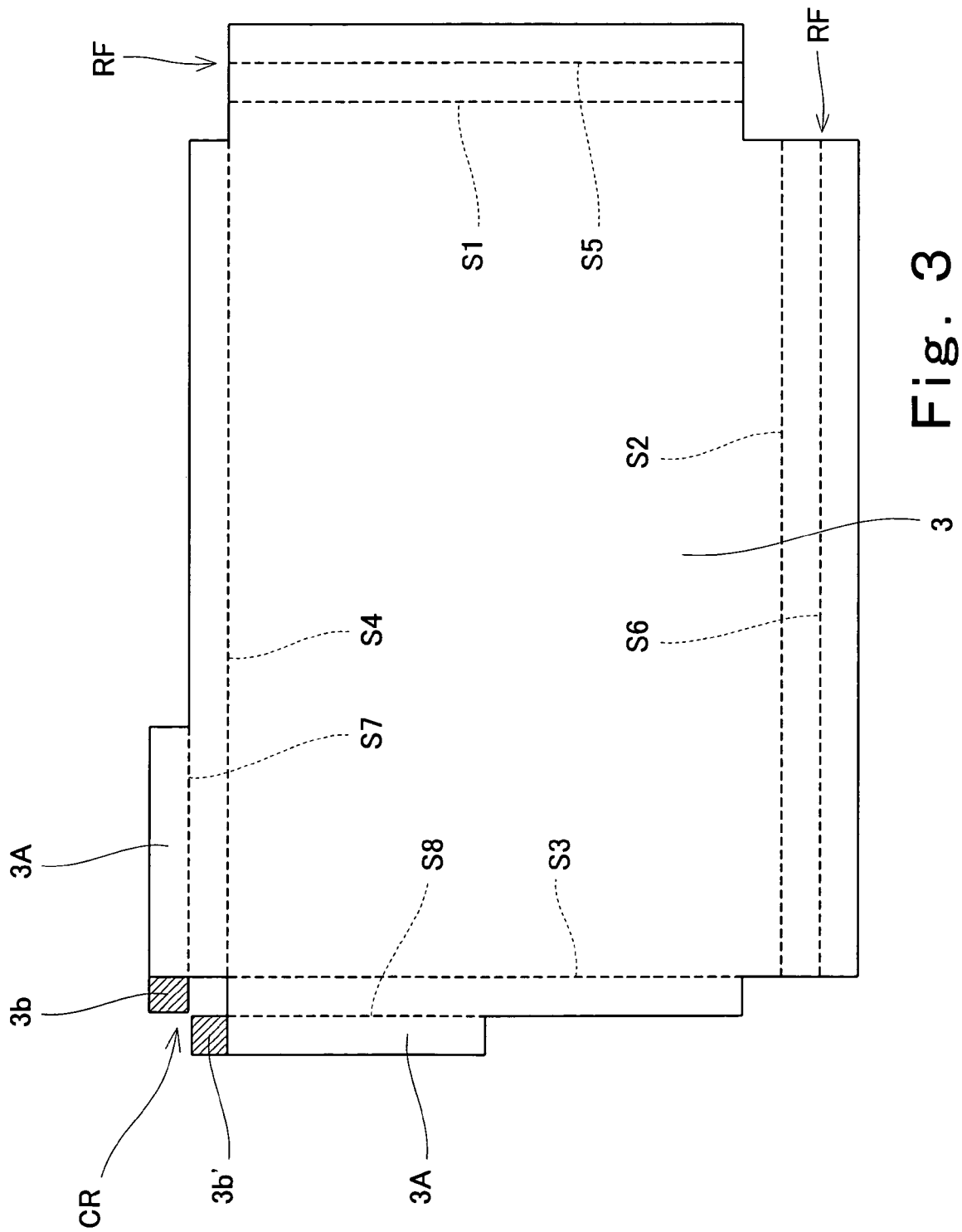
FIG. 3 is an expansion plan of a reflecting sheet shown in FIG. 1.

FIG. 3 is an expansion plan of the reflecting sheet 3. The reflecting sheet 3 is obtained by cutting in a predetermined shape configured to cover the light guiding plate 1, the fluorescent discharge tube 2, and the predetermined portion of the space E2 in which the lead wires 7 are disposed as described above. Although not shown in FIG. 3, the reflecting sheet 3 has an opening to allow the lead wires 7 to pass therethrough. The reflecting sheet 3 is provided with fold lines S1 to S8 in predetermined portions of a surface (herein, a surface which directly contacts the light guiding plate 1 and the fluorescent discharge tube 2) thereof so that the reflecting sheet 3 is folded so as to correspond to the regions to be covered. When the reflecting sheet 3 is assembled, the reflecting sheet 3 is accordion-folded along the fold lines S1 to S4 so as to be box-shaped. Within the box-shaped reflecting sheet 3, the light guiding plate 1 provided with the fluorescent discharge tube 2 along the end faces D1 thereof is disposed, and, the end faces D1 and D2 and a bottom surface (an opposite surface of the light emanating surface) of the light guiding plate 1, and a side portion of the fluorescent discharge tube 2 are covered with the reflecting sheet 3. And, the reflecting sheet 3 is accordion-folded along the fold lines S5 and S6 of the reflector portion RF so as to cover the fluorescent discharge tube 2 from above. Further, the reflecting sheet 3 is mountain-folded along the fold lines S7 and S8, and square protruding portions 3b and 3b' provided on the corner portion CR are thereby superposed. Thus, an L-shaped continuous extended separating portion 3A is formed on the corner portion CR.

The reflecting sheet 3 is made of a white resinous film having a high reflectivity, for example. The reflecting sheet 3 may be provided with various printed patterns on a portion thereof located on the bottom surface of the light guiding plate 1, for promoting a diffusion of light as it is distant from the fluorescent discharge tube 2.

The light guiding plate 1 and the fluorescent discharge tube 2 covered with the reflecting sheet 3 as described above, are stored within the lower casing 9 of a rectangular parallelepiped shape made of a resinous material. And, within the lower casing 9, the lead wires 7 respectively connected to both end portions of the fluorescent discharge tube 2 are disposed in the space E2 formed by an inner wall of the casing and the end faces D2 of the light guiding plate 1 covered with the reflecting sheet 3. The lead wires 7 are pulled out through the through-hole H provided on the side wall of the casing in the corner portion CR. And, the above-described extended separating portion 3A of the reflecting sheet 3 is disposed in the vicinity of the corner portion CR including the through-hole H in the space E2 to cover the space E2. On the other hand, the fluorescent discharge tube 2 is disposed within the space E1 formed between the inner wall of the casing and the end faces D1 of the light guiding plate 1.

Regarding the spaces E1 and E2 formed within the lower casing 9, width W1 of the space E1 is set to a minimum width necessary for the fluorescent discharge tube 2 to be disposed, and width W2 of the space E2 is set to a minimum width necessary for the lead wire 7 to be disposed, for obtaining a smaller lighting unit UT. Since a diameter of the lead wire 7 is smaller than that of the fluorescent discharge tube 2, the width W2 of the space E2 is smaller than the width W1 of the space E1. The width W1 of the space E1 corresponds to a distance between the inner wall of the lower casing 9 and the end face D1 of the light guiding plate 1, and the width W2 of the space E2 corresponds to a distance between the inner wall of the lower casing 9 and the end face D2 of the light guiding plate 1.

A light diffusion sheet 4 and a prism sheet 5 as light correction sheets are sequentially disposed on the light emanating surface side of the light guiding plate 1 stored within the lower casing 9. The light diffusion sheet 4 and the prism sheet 5 are not bonded to the light guiding plate 1, the reflecting sheet 3, and the upper and lower casings 10 and 9. The light diffusion sheet 4 is a sheet-shaped optical component used for diffusing light emanating from the light guiding plate 1 and allowing the light to uniformly enter a liquid crystal panel 11 to be described later. The prism sheet 5 is a transparent resinous film provided with triangle-shaped regular grooves on a surface thereof.

The upper casing 10 of a frame shape made of the resinous material is fitted to the lower casing 9 as a lid member so as to store the light guiding plate 1 stored within the lower casing 9, and the sheets 4 and 5 disposed on the light guiding plate 1. The lighting unit UT is structured in this manner.

Figure 4:
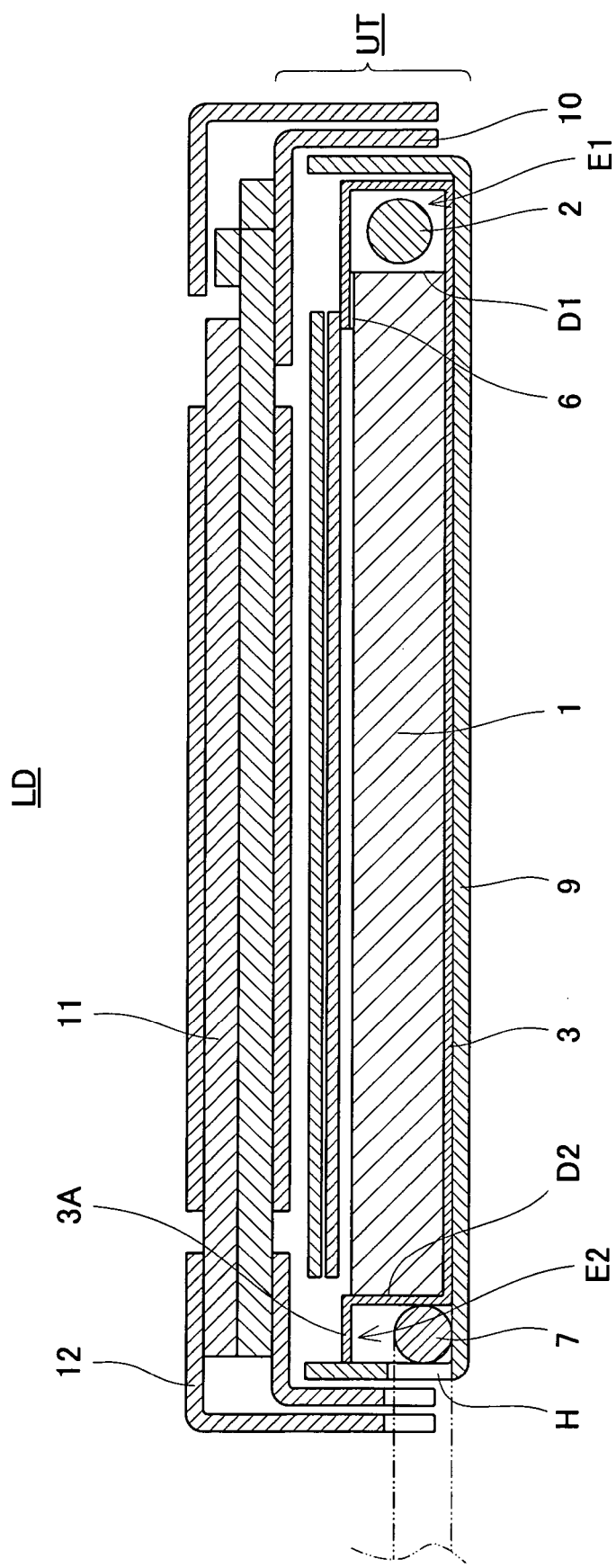
FIG. 4 is a cross-sectional view schematically showing a structure of a liquid crystal display device according to the present invention comprising the lighting unit shown in FIG. 1.

FIG. 4 is a cross-sectional view schematically showing a structure of a liquid crystal display device according to the present invention comprising the above-described lighting unit UT. As shown in FIG. 4, the liquid crystal display device LD is structured such that the liquid crystal panel 11 is disposed on the light emanating surface side of the lighting unit UT as a display portion, and a front cover 12 which is a kind of the casing is further attached to this. The liquid crystal panel 11 and the light correction sheets 4 and 5 are not bonded to each other, and there is a gap between them.

When the lighting unit UT and the liquid crystal display device LD structured as described above are operating, a high-frequency alternating current (40 to 100 kHz) generated in the power supply unit (not shown) such as the inverter is given to the fluorescent discharge tube 2 through the lead wires 7. Thereby, the high voltage is applied to the fluorescent discharge tube 2, which is thereby lighted. The light emanating from the fluorescent discharge tube 2 enters the light guiding plate 1 from the end faces D1 thereof, passes through an inside thereof, and emanates from the emanating surface thereof. Then, the light leaking out of the light guiding plate 1 and the fluorescent discharge tube 2 is reflected by the reflecting sheet 3 and is guided into the light guiding plate 1 again. So it becomes possible to increase an amount of light emanating from the light emanating surface of the light guiding plate 1. The light emanating from the light guiding plate 1 is diffused and collected by the light diffusion sheet 4 and the prism sheet 5. Thereby, uniform and highly luminous light is obtained. The light that has penetrated the sheets 4 and 5 enters the liquid crystal panel 11 disposed above. In the liquid crystal panel 11, display is performed by using this light. Hereinafter, a region of the liquid crystal panel 11 on which the display is performed and a region located below the region and concerning the display by supplying the region with the light are referred to as an effective display region of the liquid crystal display device LD.

In the lighting unit UT and the liquid crystal display device LD as described above, the vicinity of the through-hole H in the space E2 is covered with the extended separating portion 3A of the reflecting sheet 3, as described above. Therefore, as indicated by arrow G in the drawing, the extended separating portion 3 allows the dust that has entered the inside of the device from outside or the dust existing in the inside to be inhibited from entering the effective display region of the device (specifically, gaps between the light guiding plate 1 and the sheets 4 and 5, and between the sheets 4 and 5 and the liquid crystal panel 11) from the space E2. Especially, since the dust might easily enter the vicinity of the through-hole H in the space E2 from outside through the through-hole H which allows the space E2 to communicate with outside of the unit, and the width W2 is smaller and distance to the effective display region is shorter in the space E2 than in the space E1, the dust might easily enter the effective display region as compared to the space E1 if the extended separating portion 3A is not disposed. However, in the above-described structure, since the extended separating portion 3A is disposed in the above-described portion of the space E2, entry of the dust can be effectively inhibited.

Since the extended separating portion 3A is formed by a part of the reflecting sheet 3 which is easy to fold or cut, it is not required to provide another component in order to inhibit entry of the dust. And it is possible to easily dispose the portion 3A at a desired position in a desired shape by partially folding or by cutting in a predetermined shape. Furthermore, since the reflecting sheet 3 is thin and light, this does not affect lightness and small-size of the lighting unit UT and the liquid crystal display device LD.

As described above, in the lighting unit UT and the liquid crystal display device LD in this embodiment, it is possible to inhibit occurrence of non-uniform luminance due to entry of the dust, and occurrence of damage to the components in the display region such as the light correction sheets due to the dust, while achieving a light and small device. And, it is not necessary to disassemble the device to clear the entered dust away from the device. Thus, maintenance becomes easier.

SECOND EMBODIMENT

Figure 5:
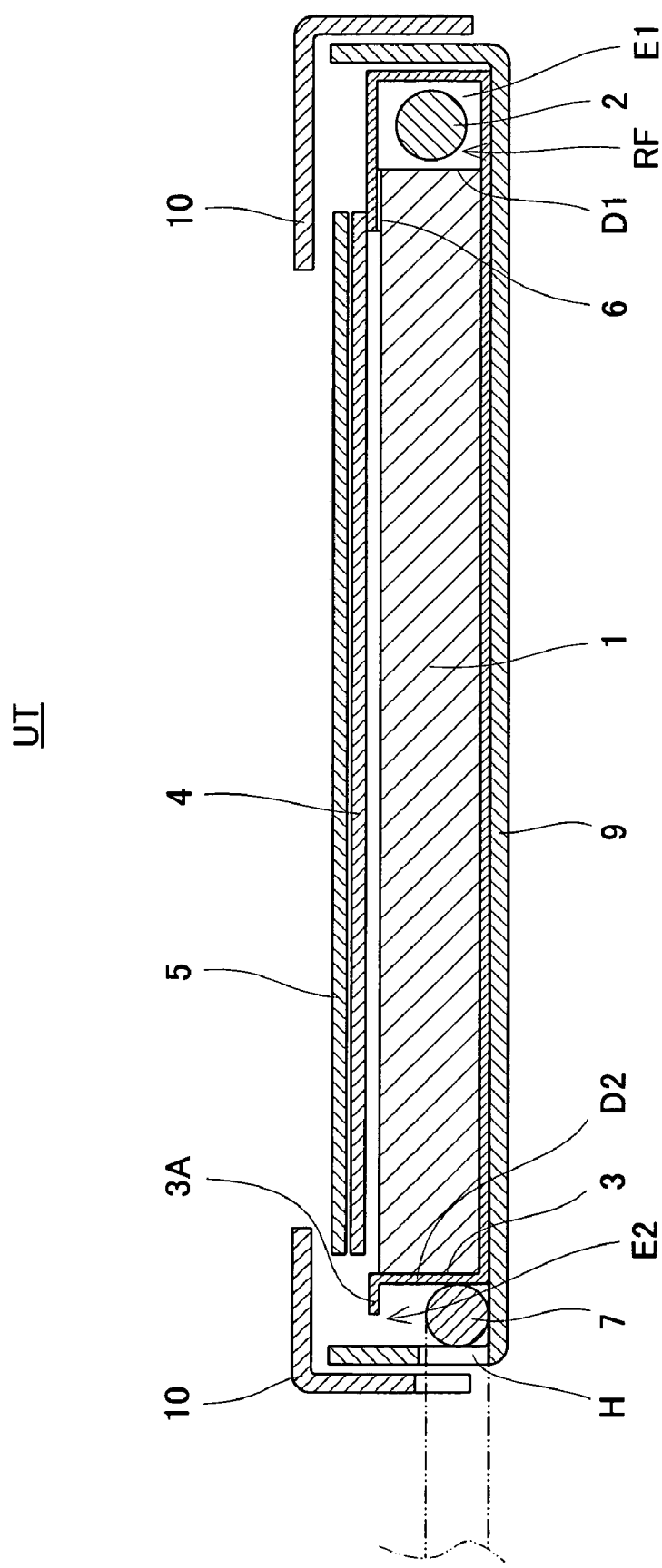
FIG. 5 is a cross-sectional view schematically showing a structure of a lighting unit according to a second embodiment of the present invention.
Figure 6:
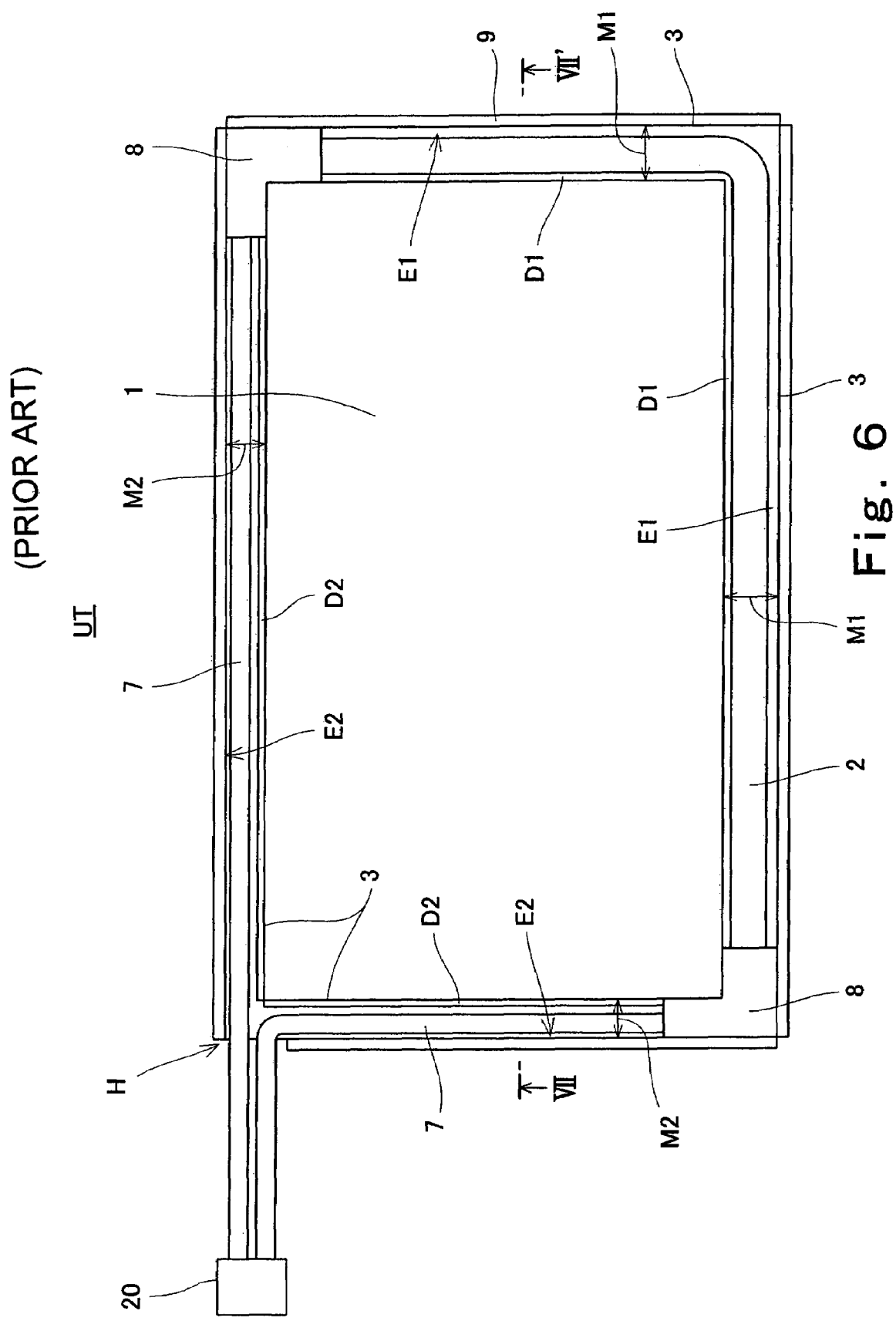
FIG. 6 is a plan view schematically showing a structure of a conventional lighting unit.
Figure 7:
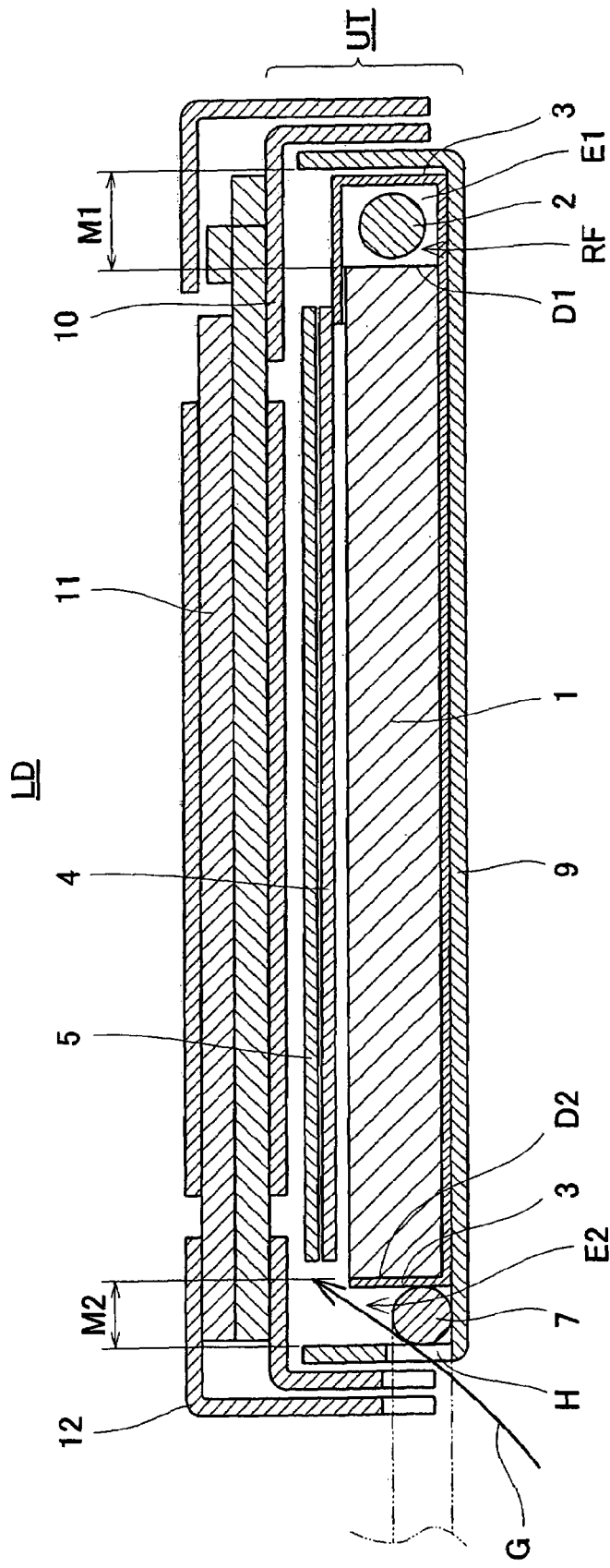
FIG. 7 is a schematic cross-sectional view taken along line VII–VII' in FIG. 6.

FIG. 5 is a cross-sectional view schematically showing a structure of a lighting unit, according to a second embodiment of the present invention. A structure of a lighting unit UT according to this embodiment is identical to that of the lighting unit UT according to the first embodiment except the followings. In the lighting unit UT of the first embodiment, the extended separating portion 3A of the reflecting sheet 3 is extended from the end faces D2 of the light guiding plate 1 to the inner wall of the lower casing 9 and completely covers the predetermined portion of the space E2, while in the lighting unit UT of this embodiment, as shown in FIG. 5, an extended separating portion 3A protrudes from end faces D2 of the light guiding plate 1 toward an inner wall of the lower casing 9 so as not to reach the inner wall. In this embodiment where only a part of the space E2 is covered with the extended separating portion 3, also, it is possible to inhibit dust from entering an effective display region.

Although in the above-described first and second embodiments, a case where the extended separating portion 3A of the reflecting sheet 3 is disposed in the vicinity of the through-hole H in the space E2 has been described, placement of the extended separating portion 3A is not limited to this, and this may be disposed in any other portions where the dust tends to enter. For example, it is preferred that the extended separating portion 3A is disposed along the entire space E2 in an L-shape, corresponding to the end faces D2 of the light guiding plate 1 so that entry of the dust is reliably and effectively inhibited. And, the placement of the extended separating portion 3A is not limited in the space E2, and this may be disposed in the space E1. In the space E2 where the dust might easily enter the effective display region due to small width W2 and a short distance to the effective display region, the entry of the dust is inhibited more effectively by disposing the extended separating portion 3A. On the other hand, in the space E1 in which width W1 thereof is larger than the width W2 of the space E2, since a distance to the effective display region is larger than in the space E2, the dust might not enter the display region so easily as in the space E2. But in this case also, the entry of the dust is effectively inhibited by disposing the extended separating portion 3A. For example, by disposing the extended separating portion 3A along an entire region of the spaces E1 and E2, it becomes possible to inhibit the entry of the dust more effectively.

Although in the above-described first and second embodiments, the corner portion CR of the reflecting sheet 3 is provided with the protruding portions 3b and 3b' as shown in FIG. 3, and the L-shaped extended separating portion 3A is formed by superposing the protruding portions 3b and 3b', this may be formed by disposing one of the protruding portions 3b and 3b'. When one of the protruding portions is disposed, this is connected to the extended separating portion on the other side so as to form an L-shape.

And, although in the above-described first and second embodiments, a case where the lighting unit UT comprises an L-shaped fluorescent discharge tube has been described, a shape of the fluorescent discharge tube is not limited to this. And, although in the above-described first and second embodiments, the reflector portion RF, the end faces D2 and the bottom surface of the light guiding plate 1 are covered with the integral reflecting sheet 3, the reflecting sheet may be separated into a reflecting sheet covering the reflector portion and a reflecting sheet covering other portions.

And, although in the above-described first and second embodiments, one light diffusion sheet 4 and one prism sheet 5 are disposed as light correction sheets, a kind and the number of the light correction sheets are not limited to this. And, a structure of the casing which composes the lighting unit UT is not limited to that of the above-described first and second embodiments, and the casing may have other structures. For example, the casing may be structured to store also the liquid crystal panel 11.

Furthermore, although in the above-described first and second embodiments, a case where the present invention is applied to an edge light type lighting unit has been described, this invention is also applicable to the lighting unit other than the edge light type. And, although in the above-described first and second embodiments, a case where the lighting unit UT according to the present invention is used in the liquid crystal display device LD has been described, use of the lighting unit UT is not limited to this.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the sprit of the invention.

INDUSTRIAL APPLICABILITY

A lighting unit according to the present invention is useful as a lighting unit used in a display device of an information device such as a notebook-type personal computer, or as the display device of a video device such as a portable television. A liquid crystal display device according to the present invention is useful as the display device of the information device such as the notebook-type personal computer or as the display device of the video device such as the portable television.

The invention claimed is:

1. A lighting unit comprising:
   a light source;
   a light guiding component for guiding light emitted from the light source to an object to be illuminated;
   a reflecting component covering an entire bottom surface of the light guiding component; and
   a casing configured to store the light source, and the light guiding component covered with the reflecting component, wherein
   a separating portion which is a part of the reflecting component is disposed in at least a part of a space formed between the light guiding component and an inner wall of the casing and communicating with the object to be illuminated.

2. The lighting unit according to claim 1, wherein the casing has a through-hole which allows the space to communicate with outside of the unit, and
   the separating portion is disposed at least in the vicinity of the through-hole in the space.

3. The lighting unit according to claim 1, wherein the reflecting component is a reflecting sheet.

4. A liquid crystal display device comprising:
   a lighting unit according to claim 1; and
   a liquid crystal panel disposed on a light emanating surface side of the lighting unit.

5. A lighting unit comprising:
   a light source;
   a light guiding component for guiding light emitted from the light source to an object to be illuminated;
   a reflecting component configured to cover at least a part of a surface of the light guiding component; and
   a casing configured to store the light source, and the light guiding component covered with the reflecting component, wherein
   a separating portion which is a part of the reflecting component is disposed in at least a part of a space formed between the light guiding component and an inner wall of the casing and communicating with the object to be illuminated, and
   the separating portion is extended from a surface of the light guiding component to the inner wall of the casing.

6. A lighting unit comprising:
   a light source
   a light guiding component for guiding light emitted from the light source to an object to be illuminated;
   a reflecting component configured to cover at least a part of a surface of the light guiding component; and
   a casing configured to store the light source, and the light guiding component covered with the reflecting component, wherein
   a separating portion which is a part of the reflecting component is disposed in at least a part of a space formed between the light guiding component and an inner wall of the casing and communicating with the object to be illuminated,
   the light guiding component is a light guiding plate;
   the light source is disposed along a first end face of the light guiding plate;
   a lead wire is disposed along a second end face of the light guiding plate for supplying the light source with a voltage;
   a bottom surface of the light guiding plate, the first end face of the light guiding plate and the light source, and the second end face of the light guiding plate are covered with the reflecting component; and
   the separating portion is disposed at least in the space between the second end face of the light guiding plate and the inner wall of the casing.

* * * * *